(12) United States Patent
Umeda et al.

(10) Patent No.: US 8,084,014 B2
(45) Date of Patent: Dec. 27, 2011

(54) BARIUM TITANATE POWDER AND METHOD FOR PRODUCING SAME

(75) Inventors: Tetsu Umeda, Tsukuba (JP); Yoshio Uchida, Tsukuba (JP); Takumi Shibuta, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 191 days.

(21) Appl. No.: 10/554,054

(22) PCT Filed: Apr. 22, 2004

(86) PCT No.: PCT/JP2004/005824
§ 371 (c)(1),
(2), (4) Date: Oct. 24, 2005

(87) PCT Pub. No.: WO2004/096712
PCT Pub. Date: Nov. 11, 2004

(65) Prior Publication Data
US 2006/0280675 A1    Dec. 14, 2006

(30) Foreign Application Priority Data

Apr. 25, 2003 (JP) ................... 2003-121284
Nov. 11, 2003 (JP) ................... 2003-380777

(51) Int. Cl.
*C01G 23/047* (2006.01)
*C01F 11/02* (2006.01)

(52) U.S. Cl. .................... 423/598; 423/594.16
(58) Field of Classification Search ............... 423/593.1, 423/598, 594.16
See application file for complete search history.

(56) References Cited

U.S. PATENT DOCUMENTS

| | | | |
|---|---|---|---|
| 5,688,480 A | 11/1997 | Mohri et al. | |
| 5,846,505 A * | 12/1998 | Saegusa | 423/263 |
| 6,485,701 B2 | 11/2002 | Miyoshi | |
| 6,808,697 B2 | 10/2004 | Harada et al. | |
| 2002/0064499 A1 * | 5/2002 | Uchida | 423/598 |
| 2002/0090335 A1 | 7/2002 | Harada et al. | |
| 2002/0135971 A1 | 9/2002 | Nakaya et al. | |
| 2002/0182141 A1 | 12/2002 | Uchida | |
| 2003/0012727 A1 | 1/2003 | Yoshikawa et al. | |
| 2004/0028601 A1 * | 2/2004 | Torii et al. | 423/598 |

FOREIGN PATENT DOCUMENTS

| | | |
|---|---|---|
| JP | 63-236713 A | 10/1988 |
| JP | 3-246902 A | 11/1991 |
| JP | 04-74715 A | 3/1992 |
| JP | 04-132614 A | 5/1992 |
| JP | 8-119745 A | 5/1996 |
| JP | 2001-316114 A | 11/2001 |
| JP | 2002-60219 A | 2/2002 |
| JP | 2002-167281 A | 6/2002 |
| JP | 2002-211926 A | 7/2002 |
| JP | 2002-234771 A | 8/2002 |
| JP | 2002-255552 A | 9/2002 |
| JP | 2003-002738 A | 1/2003 |

* cited by examiner

Primary Examiner — Edward M Johnson
(74) Attorney, Agent, or Firm — Sughrue Mion, PLLC

(57) ABSTRACT

A barium titanate powder and a method for producing the same are provided. The barium titanate powder comprises a perovskite structure having a ratio c/a of 1.008 or more and ratio d/D of from 1 to 1.5, wherein "c" is a length of the c axis, "a" is a length of the a axis in the perovskite structure, "d" is an average particle diameter and "D" is a equivalent specific surface area diameter. The method of producing a barium titanate powder, comprises the steps of: (1) heating a mixture containing a titanium compound and a barium compound under a gas atmosphere containing a halogen at a temperature of not less than about 200° C. and less than the temperature for generation of barium titanate, (2) calcining the obtained mixture under an atmosphere containing substantially no halogen at a temperature of not lower than the temperature for generation of barium titanate.

6 Claims, No Drawings

BARIUM TITANATE POWDER AND METHOD FOR PRODUCING SAME

FIELD OF THE INVENTION

The present invention relates to a barium titanate powder and a method for producing the same.

DESCRIPTION OF BACKGROUND ART

Barium titanate is widely used as a dielectric of a multilayer capacitor. A multilayer capacitor containing barium titanate has dielectric layers made of barium titanate and electrode layers for applying voltage on the dielectric layers in which the dielectric layers and the electrode layers are mutually laminated. Production of a multilayer capacitor is conducted by a method in which layers made of a barium titanate powder and electrode layers are laminated and the laminate is sintered at about 1400° C.

Conventionally, expensive platinum group elements have been used as a material of an electrode layer, however, from the standpoint of reduction in cost, application of a cheap metal such as nickel and the like is under investigation.

However, since the melting point of nickel (1450° C.) is lower as compared with platinum group elements (melting point of platinum: 1770° C.), nickel is diffused at sintering temperature in the conventional method, it is difficult to manufacture a multilayer capacitor.

On the other hand, when the sintering temperature is lowered, formation of a barium titanate dielectric layer having high density becomes difficult.

Therefore, there is desired a development of a barium titanate powder capable of forming a dielectric layer of high density even in sintering at lower temperature, for example, 1100 to 1200° C.

DISCLOSURE OF THE INVENTION

The present inventors have intensively studied a barium titanate powder excellent in sintering property at lower temperature and resultantly completed the present invention.

Namely, the present invention provides a barium titanate powder comprising a perovskite structure having a ratio c/a of 1.008 or more and ratio d/D of from 1 to 1.5, wherein "c" represents a length of the c-axis, "a" represents a length of the a-axis in the perovskite structure, "d" represents an average particle diameter and "D" represents an equivalent BET specific surface area diameter.

Further, the present invention provides a method for producing a barium titanate powder, comprising the steps of:

(1) heating a mixture containing a titanium compound and a barium compound under a gas atmosphere containing a halogen at a temperature of not less than about 200° C. and less than the temperature for generation of barium titanate, (2) calcining the obtained mixture under an atmosphere containing substantially no halogen at a temperature of not lower than the temperature for generation of barium titanate.

The barium titanate powder of the present invention is excellent in sintering property at lower temperature and useful as a raw material of a highly dense dielectric for multilayer capacitor.

Further, according to a production method of the present invention, such a barium titanate powder is obtained easily.

DETAILED DESCRIPTION OF PREFERRED EMBODIMENTS

The barium titanate powder of the present invention has a perovskite structure having a ratio c/a of 1.008 or more, and "c" represents a length of the c-axis, "a" represents a length of the a-axis in the perovskite structure.

The barium titanate powder of the present invention has a ratio d/D of 1 or more and 1.5 or less, and "d" represents an average particle diameter and "D" represents an equivalent BET specific surface area diameter. The upper limit of d/D is preferably 1.3 and further preferably 1.2.

The barium titanate powder of the present invention is preferably that has smaller average particle diameter, for example, that has an average particle diameter of 0.3 µm or less. Barium titanate powder having smaller average particle diameter can be suitably used as a material for forming a dielectric layer having smaller thickness, for example, 1 to 2 µm. A multilayer capacitor containing a dielectric layer having decreased thickness is preferable since the electric capacity per unit volume is higher. The barium titanate powder obtained by the present invention usually has an average particle diameter of about 0.05 µm or more.

The barium titanate powder of the present invention preferably contains a particle density of 5.8 g/cm$^3$ or more. It is assumed that in case a barium titanate powder has a smaller particle density, the particle therein has a void or a hydroxyl group.

The barium titanate powder of the present invention preferably has higher loose bulk density, for example, it is preferably 1.4 g/cm$^3$ or more. Further, the barium titanate powder preferably has higher packed bulk density, and for example, it is preferably 1.8 g/cm$^3$ or more. On the other hand, the upper limit of the loose bulk density of a barium titanate powder is not particularly limited, and it is preferably about 2 g/cm$^3$. Also the upper limit of the packed bulk density of a barium titanate powder is not particularly limited, and it is preferably about 2.5 g/cm$^3$.

In a method of mixing a barium titanate powder, solvent and dispersing agent, forming a sheet from the obtained slurry, and calcining the sheet to obtain a dielectric layer (doctor blade method), a barium titanate powder having the above-described c/a, d/D, loose bulk density and packed bulk density is used suitably as a raw material since a highly dense sintered body is obtained even by sintering at lower temperature and the use amount of a solvent is decreased. Examples of the solvent used in the doctor blade method include organic solvents such as toluene, ethanol and acetone; water having pH regulated with an alkali such as ammonia, ammonium carbonate and ammonium hydrogen carbonate, and the like. Examples of the dispersing agent include cationic, anionic, polyester-based, polycarboxylic amine-based and vinyl-based compounds. A barium titanate powder may be deagglomerated by using an apparatus such as an ultrasonic dispersing machine, ball mill, vibration mill and rod mill.

The barium titanate powder is used suitably also as a raw material for a build up substrate. The build up substrate has been developed in late years, and is obtained by kneading a powder such as barium titanate and a resin, and molding the resultant.

As described above, the barium titanate powder of the present invention is excellent not only in sintering property at lower temperature but also in dispersibility and filling property. Further, since a sintered body having a flat surface, for example, that having no pore or projection having a size of 0.5 µm or more on the surface, is made from the barium titanate powder of the present invention, the barium titanate powder is useful as a raw material for dielectric filters, insulators for transparent electrode of plasma display panel, dielectric layers of inorganic EL, and the like.

The barium titanate powder of the present invention is prepared, for example, by a method comprising the steps of:

(1) heating a mixture containing a titanium compound and a barium compound under a gas atmosphere containing a halogen at a temperature of not less than about 200° C. and less than the temperature for generation of barium titanate, (2) calcining the obtained mixture at a temperature of not lower than the temperature for generation of barium titanate.

The titanium compound contained in the mixture of the step (1) may be that capable of reacting with a barium compound by calcination described later to generate barium titanate, and includes oxides, hydroxide or hydroxide gel of titanium. Examples thereof include titanium dioxide and precipitation (titanium hydroxide or hydroxide gel) obtained by neutralizing titanium tetrachloride. The barium compound contained in the mixture of the step (1) may be that capable of reacting with the above-described titanium compound to generate barium titanate by calcination described later, and includes oxides, carbonate, hydroxide or carboxylate of barium, and the like. Examples thereof include barium carbonate, barium hydroxide and barium acetate.

As the mixture containing a titanium compound and a barium compound, multi-component compounds of titanium and barium may be used. Examples of the multi-component compounds include titanyl barium oxalate tetrahydrate.

The mixture in the step (1) may also be that containing an agent (flux) for improving the crystallinity of barium titanate, in addition to a titanium compound, barium compound or multi-component compound of titanium and barium. Examples of the agent include borate and ammonium salt.

The above mixture may be prepared by a method of mixing a titanium compound, barium compound and optional agent in a dry or wet condition. Further, the obtained mixture may be subjected to pulverizing, if necessary. Mixing may be conducted by using an apparatus such as a ball mill, vibration mill, Henschel mixer, vertical granulator and dynamic mill. Pulverization may be conducted by using a ball mill, vibration mill, dynamic mill and the like. It is preferable to conduct mixing and pulverization by using a ball mill, vibration mill, since both operations can be conducted in the same apparatus.

Heating in the step (1) is conducted under a gas atmosphere containing a halogen. In this operation, examples of the halogen include chlorine, bromine and iodine, preferably chlorine. Examples of the gas containing a halogen include molecular halogens such as $Cl_2$, $Br_2$ and $I_2$; hydrogen halides such as HCl, HBr and HI; halides and the like. Among them, preferable are molecular halogens and hydrogen halides, further preferable are hydrogen halides, and particularly preferable is hydrogen chloride.

The halogen concentration in the atmosphere is usually about 0.5 vol % or more, preferably about 1 vol % or more, further preferably about 3 vol % or more, and usually about 50 vol % or less, preferably about 30 vol % or less, further preferably about 20 vol % or less. The atmosphere contains gases other than halogen, for example, gases such as nitrogen, oxygen, air and argon. The atmosphere usually has a total pressure of about 0.1 MPa or more and about 1 MPa or less.

Heating in the step (1) is conducted at a temperature of not less than about 200° C. and less than the temperature for generation of barium titanate. The heating temperature is preferably about 300° C. or more, further preferably about 500° C. or more, and less than about 800° C., further preferably about 700° C. or less. The heating time is usually about 1 minute or more and about 10 hours or less.

Calcination in the step (2) is conducted under an atmosphere containing substantially no halogen unlike the above-described heating step. The halogen is chlorine, bromine, iodine or fluorine. The concentration thereof is usually about 0.1 vol % or less. The total pressure of the atmosphere in the calcination step is usually about 0.1 MPa or more, and about 1 MPa or less.

The calcination temperature may be not lower than the temperature for generation of barium titanate from a mixture containing a titanium compound and a barium compound, and for example, it is about 800° C. or more. The upper limit of the calcination temperature is not particularly limited, and it is usually about 1000° C. The calcination time may be that for sufficient progress of generation of barium titanate, and though differing depending on the calcination temperature, it is usually about 10 minutes or more and about 10 hours or less. The temperature for generation of barium titanate from a mixture containing a titanium compound and a barium compound may be estimated by a peak position in an endo-exothermic curve measured by thermal analysis (TG-DTA).

The step (1) and the step (2) may be conducted, for example, by a method of heating a mixture containing a titanium compound and a barium compound in a halogen-containing gas atmosphere while introducing a gas containing a halogen into a furnace at a temperature of the above described range, for example, 200° C. or more and less than 800° C., replacing the gas in the furnace with a gas containing no halogen (for example, air) and calcining the resultant at a temperature for generation of barium titanate, for example, 800° C.

It is preferable to wash the barium titanate powder obtained in the step (2). The washing liquid is, for example, water, an aqueous solution of a carbonate, preferably, an aqueous solution of a carbonate. By washing, adhesion substances, which is halogen as an atmosphere gas in heating or its compound and the like, on the surface of particles of a barium titanate powder is removed. It is preferable that the washed powder is re-calcined. Re-calcination may be conducted under an atmosphere, for example under an air, containing substantially no halogen such as chlorine, bromine, iodine and fluorine at a temperature of 800° C. or more and 1100° C. or less. In the re-calcination atmosphere, the halogen concentration is usually less than about 0.1 vol % and the total pressure is usually about 0.1 MPa or more and about 1 MPa or less.

The barium titanate powder obtained in the step (2) or optionally the above-described washed and re-calcined powder may be further classified and pulverized.

A barium titanate powder obtained by the above-described method is usually in the form of fine particle, and gives easy dispersion of primary particles. That is, the barium titanate powder contains little agglomerated particles, and a binding strength between particles is lowered if agglomerated particles are present, therefore, pulverizing energy necessary for deagglomerating the particles is small, and the amount of agglomerated particles is decreased by pulverizing in a short period of time by using a ball mill and vibration mill.

In case a powder containing strongly agglomerated particles is powerfully pulverized, a pulverizing medium in a ball mill and vibration mill may be broken, resultantly, fragments may be mixed in, and by mill packing, particles may be re-agglomerated to generate coarse particles.

In case the barium titanate powder obtained by the method of the present invention is used, these incidents are decreased.

EXAMPLES

The present invention will be illustrated further in detail by examples below, but the scope of the invention is not limited to them. The physical properties of a barium titanate powder were measured by the following methods.

Crystal Phase, c/a:

An X-ray diffraction pattern was measured by using an X-ray diffractometer ("RINT type", manufactured by RIGAKU) and crystal phase was determined. The resulted X-ray diffraction pattern was analyzed by a Rietveld method, the lengths of the a axis and the c axis were calculated and the ratio c/a was obtained.

Average Particle Diameter d (μm):

A powder was dispersed in a 0.2 wt % sodium hexametaphosphate aqueous solution and ultrasonic-treated, then, the average particle diameter was measured by using a laser diffraction scattering type particle size distribution analyzer ("Master Sizer 2000 type", manufactured by Malvern).

Equivalent BET Specific Surface Area Diameter D (μm):

It was calculated from the BET specific surface area according to the following equation, wherein the BET specific surface area is measured by using BET specific surface area analyzer ("Flow Sorb II2300 type", manufactured by Shimadzu Corp.) based on a single-point BET method.

$$6/[\text{theoretical density (g/cm}^3\text{) of barium titanate} \times \text{BET specific surface area (m}^2\text{/g)}]$$

wherein the theoretical density is 6.02 g/cm$^3$, which is a specific gravity of tetragonal barium titanate.

Particle Density (g/cm$^3$)

A sample was dried at 120° C., then, mono-axially pressed at a pressure of 300 kg/cm$^2$ to obtain pellets, and the particle density of the pellets were measured by using a pycnometer ("Ultrapycnometer UPY-4 type", manufactured by Yuasa Ionics).

Loose Bulk Density, Packed Bulk Density (g/cm$^3$):

Fifty gram of a sample was charged in a 100 mL glass measuring cylinder, and the apparent volume $V_L$ of the sample was measured. The loose bulk density (=W/$V_L$) was calculated from the weight W (=50 g) and the volume $V_L$.

Next, the cylinder containing the sample was dropped from a height of 5 cm 100 times and tapping was conducted, and the apparent volume $V_P$ of the sample was measured. The packed bulk density (=W/$V_P$) was calculated from the weight W (=50 g) and the volume $V_P$. In the course of tapping, decrease in the sample volume in the measuring cylinder stopped and the sample volume showed a constant value.

Atomic Ratio Ba/Ti:

The peak intensities of Ba and Ti were measured on a sample and a standard sample, respectively, by using a fluorescent X-ray analyzer ("PW1480 type", manufactured by Phillips). On a standard sample (composition has been analyzed by chemical analysis, and the composition is determined), a calibration curve was drawn and the Ba/Ti ratio of the sample was obtained from this.

Halogen (Chlorine) Content (ppm):

The peak intensities of halogen were measured on a sample and a standard sample, respectively, using a fluorescent X-ray analyzer ("PW1480 type", manufactured by Phillips), and from a standard sample and peak intensity ratio, the halogen content of a sample was calculated. The halogen content of a standard sample was measured by dissolving a standard sample in an acid, then, subjecting the solution to a chemical titration method.

Example 1

[Production I of Barium Titanate Powder]

Barium carbonate (trade name: "LC-1", manufactured by Nippon Kagaku, BET specific surface area: 10.2 m$^2$/g) and titanium dioxide (trade name: "PR-401M", manufactured by Ishihara Techno, BET specific surface area: 20.7 m$^2$/g, rutile ratio: 50.7%) were weighed so that the molar ratio of barium carbonate to titanium dioxide was 1:1. The ignition loss (weight loss when moisture or volatile components are removed by heating at 700° C.) was previously measured, and the weight was obtained by correcting weight change due to volatilization of moisture and the like by heating. Weighed barium titanate and titanium dioxide (total: 1.1 kg) were dry-mixed for 20 hours using a polyethylene pot mill having a content volume of 10 L charged with a pulverizing medium (plastic ball containing 15 mmφ iron core). The mixture had a BET specific surface area of 13.8 m$^2$/g. As a result of TG-DTA, the temperature for generation of barium titanate from this mixture was 820° C.

The result mixed was placed in a quarts glass furnace core tube (content volume: 20 L) of a tubular furnace, the atmosphere in the tube was purged with nitrogen, then, temperature rising was initiated. When the temperature reached 600° C., a gas of hydrogen chloride 3 vol %-nitrogen 97 vol % was introduced and heated until 700° C. Then, the atmosphere was replaced with air and heated up to 950° C., and calcination was conducted while maintaining the temperature at 950□ for 2 hours. The total pressures of the atmosphere in heating and calcination were atmospheric pressure (about 0.1 MPa).

The powder obtained by calcination was dispersed in a 0.8 wt % ammonium hydrogen carbonate aqueous solution, then, washed by filtration. The washed powder was dried at 130° C., and re-calcined by maintaining at 900° C. for 3 hours in air.

The powder obtained by re-calcination was pulverized for 20 hours using a polyethylene pot having a content volume of 10 L charged with a pulverizing medium (plastic ball containing 15 mmφ iron core), to obtain a barium titanate powder. The physical properties of this barium titanate powder are shown in Table 1 and Table 2.

[Evaluation 1 of Barium Titanate Powder]

The above-described barium titanate powder was mono-axially pressed into a cylindrical green body of 13 mmφ, then, this was isostatic-pressed at a pressure of 1.5 t/cm$^2$. The resulted green body was sintered under conditions of 1100° C. and 3 hours to obtain a sintered body. The density of the green body was obtained from the weight measured and the volume calculated from the internal diameter, outer shape and length of the cylindrical green body. The density of the sintered body was obtained by an Archimedes' method.

Twenty five parts by weight of ethanol and 0.15 parts by weight of a dispersing agent (trade name: "SN-9228", manufactured by Sannopco) were added to 75 parts by weight of the above barium titanate powder and the mixture was stirred, further, subjected to a dispersion treatment by ultrasonic to obtain a slurry. The viscosity of this slurry was measured using a B type viscometer under conditions of No. 4 rotor and 12 rpm. The results of them are shown in Table 3.

[Evaluation 2 of Barium Titanate Powder]

One hundred parts by weight of the above barium titanate powder, 100 parts by weight of a solvent (toluene/ethanol=1: 9) and a dispersing agent (trade name: "SN-9228", manufactured by Sannopco) were mixed for 2 hours using a ball mill charged with a pulverizing medium (trade name: "Highplaball", nylon ball containing iron core) to obtain a slurry. This slurry was slip-cast to obtain a green body which was dried, then, sintered for 3 hours in air at 1200° C.. The resulted sintered body had a density of 5.75 g/cm$^3$ (95.6% of theoretical density). On the surface of the sintered body, a range of a longitudinal length of 5 mm and a cross length of 5 mm was observed by a scanning electron microscope, as a result, pores and projections having a size of 0.5 μm or more were not found.

Example 2

A barium titanate powder was obtained by the same operation as in Example 1 [production I of barium titanate powder] except that the calcination temperature was changed from 950° C. to 900° C. The physical properties of the resulted barium titanate powder are shown in Table 1 and Table 2. This barium titanate powder was evaluated in the same operation as in Example 1 [evaluation 1 of barium titanate powder]. The results are shown in Table 3. Further, this barium titanate powder was evaluated by conducting the same operation as in Example 1 [evaluation 2 of barium titanate powder]. The sintered body obtained in this procedure had a density of 5.69 g/cm$^3$ (94.6% of theoretical density), and pores and projections having a size of 0.5 μm or more were not found on its surface.

Example 3

A barium titanate powder was obtained by the same operation as in Example 1 [production I of barium titanate powder] except that the calcination temperature was changed from 950° C. to 850° C. and the re-calcination temperature was changed from 900° C. to 1000° C. The physical properties of the resulted barium titanate powder are shown in Table 1 and Table 2. This barium titanate powder was evaluated in the same operation as in Example 1 [evaluation 1 of barium titanate powder]. The results are shown in Table 3.

Example 4

A barium titanate powder was obtained by the same operation as in Example 1 [production I of barium titanate powder] except that the re-calcination temperature was changed from 900° C. to 950° C. The physical properties of the resulted barium titanate powder are shown in Table 1 and Table 2. This barium titanate powder was evaluated in the same operation as in Example 1 [evaluation 1 of barium titanate powder]. The results are shown in Table 3.

Comparative Example 1

A barium titanate powder was obtained by the same operation as in Example 1 [production I of barium titanate powder] except that the heating (and calcination) atmosphere was changed to air. The physical properties of the resulted barium titanate powder are shown in Table 1 and Table 2. This barium titanate powder was evaluated in the same operation as in Example 1 [evaluation 1 of barium titanate powder]. The results are shown in Table 3.

Comparative Example 2

[Production II of Barium Titanate Powder]

A titanium tetrachloride aqueous solution (manufactured by Sumitomo Sitix Corp.) diluted with water so that the concentration was 2.5 mol/L in terms of titanium dioxide, and a 5 wt % sodium hydroxide aqueous solution were poured into 1 L of ion exchanged water cooled with ice while adjusting pH of the neutralized liquid in the range of 3.7 to 4.3 by a pH controller. The resulted hydrated titanium dioxide precipitate was filtrated using a suction filtration apparatus and washed. This precipitate was dried at 110 to obtain a powder having a BET specific surface area of 200 to 240 m$^2$/g.

The resulted precipitate was weighed in an amount of 15 g in terms of titanium dioxide, and to this was added ion exchanged water to obtain a suspension. This suspension and barium hydroxide octahydrate (manufactured by Wako Pure Chemical Industries) were mixed so that the atomic ratio Ba/Ti was 1.4. The resulted mixture was subjected to a hydrothermal treatment at 150° C. for 1 hour. Then, solid in the mixture was filtrated and washed and dried at 110° C., further, calcined at 600° C. in air, to obtain a barium titanate powder. The physical properties of the resulted barium titanate powder are shown in Table 1 and Table 2. This barium titanate powder was evaluated in the same operation as in Example 1 [evaluation 1 of barium titanate powder] The results are shown in Table 3.

Comparative Example 3

A barium titanate powder was obtained by the same operation as in Comparative Example 2 [production II of barium titanate powder] except that the calcination temperature was changed from 600° C. to 800° C. The physical properties of the resulted barium titanate powder are shown in Table 1 and Table 2. This barium titanate powder was evaluated in the same operation as in Example 1 [evaluation 1 of barium titanate powder]. The results are shown in Table 3.

Production Example 1

A barium titanate powder was obtained by the same operation as in Example 1 [production I of barium titanate powder] except that the calcination temperature was changed from 950° C. to 990° C. The physical properties of the resulted barium titanate powder are shown in Table 4 and Table 5.

Production Example 2

A barium titanate powder was obtained by the same operation as in Example 1 [production I of barium titanate powder] except that the gas to be introduced in heating was changed from hydrogen chloride 3 vol %-nitrogen 97 vol % to hydrogen chloride 10 vol %-nitrogen 90 vol %. The physical properties of the resulted barium titanate powder are shown in Table 4 and Table 5.

Production Example 3

A powder was obtained by the same operation as in Example 1 [production I of barium titanate powder] except that the calcination temperature was changed from 950° C. to 850° C. and the heating (and calcination) atmosphere was changed to air. The resulted powder was not a BaTiO$_3$ single phase, and phases of BaCO$_3$, BaO and TiO$_2$ were contained.

Production Example 4

A barium titanate powder was obtained by the same operation as in Example 1 [production I of barium titanate powder] except that the gas to be introduced in heating was changed from air to hydrogen chloride 3 vol %-nitrogen 97 volt. The physical properties of the resulted barium titanate powder are shown in Table 4 and Table 5. In this example, the powder after calcination contained barium chloride.

TABLE 1

Various physical properties of barium titanate powder

|  | crystal phase | c/a | average particle diameter d μm | BET specific surface area m²/g | equivalent BET specific surface area diameter μm | d/D | particle density g/cm³ |
|---|---|---|---|---|---|---|---|
| Example 1 | BaTiO₃ single phase | 1.0095 | 0.130 | 8.54 | 0.116 | 1.12 | 5.88 |
| Example 2 | BaTiO₃ single phase | 1.0089 | 0.130 | 8.65 | 0.115 | 1.13 | 5.86 |
| Example 3 | BaTiO₃ single phase | 1.0097 | 0.145 | 7.27 | 0.137 | 1.06 | 5.92 |
| Example 4 | BaTiO₃ single phase | 1.0095 | 0.185 | 6.49 | 0.153 | 1.20 | 5.95 |
| Comparative Example 1 | BaTiO₃ single phase | 1.0073 | 0.162 | 7.30 | 0.136 | 1.19 | 5.84 |
| Comparative Example 2 | BaTiO₃ single phase | 1.0007 | 0.131 | 11.1 | 0.090 | 1.46 | 5.76 |
| Comparative Example 3 | BaTiO₃ single phase | 1.0060 | 0.389 | 7.26 | 0.137 | 2.83 | — |

TABLE 2

Various physical properties of barium titanate powder

|  | Loose bulk density g/cm³ | packed bulk density g/cm³ | Atomic ratio Ba/Ti | chlorine content ppm |
|---|---|---|---|---|
| Example 1 | 1.61 | 2.04 | 1.000 | 26 |
| Example 2 | 1.55 | 2.00 | 1.001 | 35 |
| Example 3 | 1.44 | 2.00 | 0.998 | 46 |
| Example 4 | 1.45 | 1.92 | 0.997 | 29 |
| Comparative Example 1 | 1.40 | 1.78 | 0.998 | — |
| Comparative Example 2 | 1.08 | 1.45 | 0.997 | 57 |
| Comparative Example 3 | 1.07 | 1.45 | 0.997 | — |

TABLE 3

Evaluation results of barium titanate powder

|  | Density of green body g/cm³ | Density of sintered body g/cm³ | slurry viscosity mPa·s |
|---|---|---|---|
| Example 1 | 3.65 | 5.82 | 13160 |
| Example 2 | 3.59 | 5.85 | — |
| Example 3 | — | 5.92 | — |
| Example 4 | — | 5.99 | — |
| Comparative Example 1 | 3.39 | 4.94 | — |
| Comparative Example 2 | 3.28 | 5.16 | — |
| Comparative Example 3 | 3.50 | 4.98 | 26460 |

TABLE 4

Various physical properties of barium titanate powder

|  | crystal phase | c/a | average particle diameter d μm | BET specific surface area m²/g | equivalent BET specific surface area diameter μm | d/D |
|---|---|---|---|---|---|---|
| Production Example 1 | BaTiO₃ single phase | 1.0096 | 0.159 | 7.12 | 0.140 | 1.14 |
| Production Example 2 | BaTiO₃ single phase | 1.0083 | 0.160 | 7.19 | 0.139 | 1.15 |
| Production Example 4 | BaTiO₃ single phase | 1.0085 | 0.282 | 6.69 | 0.149 | 1.89 |

TABLE 5

Various physical properties of barium titanate powder

|  | loose bulk density g/cm³ | packed bulk density g/cm³ | atomic ratio Ba/Ti | chlorine content ppm |
|---|---|---|---|---|
| Production Example 1 | 1.47 | 2.00 | 0.998 | — |
| Production Example 2 | 1.56 | 2.01 | 0.998 | — |
| Production Example 4 | 1.33 | 1.88 | 0.996 | 260 |

The invention claimed is:

1. A barium titanate powder comprising a perovskite structure having a ratio c/a of 1.0089 or more, ratio d/D of from 1 to 1.5, atomic ratio Ba/Ti of 0.997 to 1.001, and BET specific surface area of from 6.49 m²/g to 8.65 m²/g, wherein "c" is a length of a c axis, "a" is a length of an a axis in the perovskite structure, "d" is an average particle diameter and "D" is an equivalent BET specific surface area diameter.

2. The barium titanate powder according to claim 1 wherein the average particle diameter is 0.3 μm or less.

3. The barium titanate powder according to claim 2 wherein the average particle diameter is 0.05 μm or more.

4. The barium titanate powder according to claim 1 wherein the particle density is 5.8 g/cm³ or more.

5. The barium titanate powder according to any of claims 1 to 4 wherein the loose bulk density is 1.4 g/cm³ or more and the packed bulk density is 1.8 g/cm³ or more.

6. A barium titanate powder according to claim 1, wherein the ratio Ba/Ti is from 0.997 to 0.998.

* * * * *